US008659918B2

(12) United States Patent
Muneshima et al.

(10) Patent No.: US 8,659,918 B2
(45) Date of Patent: Feb. 25, 2014

(54) METHOD OF CONTROLLING POWER CONVERSION DEVICE

(75) Inventors: Masakazu Muneshima, Tokyo (JP); Yasuhiro Yamamoto, Tokyo (JP); Yu Sasaki, Tokyo (JP); Takuya Sugai, Tokyo (JP); Akira Shigaki, Tokyo (JP)

(73) Assignee: Meidensha Corporation, Tokyo (JP)

( * ) Notice: Subject to any disclaimer, the term of this patent is extended or adjusted under 35 U.S.C. 154(b) by 300 days.

(21) Appl. No.: 13/264,592

(22) PCT Filed: Apr. 15, 2010

(86) PCT No.: PCT/JP2010/056786
§ 371 (c)(1),
(2), (4) Date: Oct. 14, 2011

(87) PCT Pub. No.: WO2010/119929
PCT Pub. Date: Oct. 21, 2010

(65) Prior Publication Data
US 2012/0033470 A1    Feb. 9, 2012

(30) Foreign Application Priority Data
Apr. 16, 2009    (JP) .................................. 2009-099491

(51) Int. Cl.
*H02M 1/12*    (2006.01)
(52) U.S. Cl.
USPC .............................................. 363/41; 363/98
(58) Field of Classification Search
USPC .............................................. 363/41, 95, 98
See application file for complete search history.

(56) References Cited

U.S. PATENT DOCUMENTS

| 4,847,743 | A | 7/1989 | Kamiyama | |
|---|---|---|---|---|
| 5,610,806 | A * | 3/1997 | Blasko et al. | 363/41 |
| 5,623,192 | A | 4/1997 | Yamamoto | |
| 6,324,085 | B2 * | 11/2001 | Kimura et al. | 363/132 |
| 6,704,212 | B2 * | 3/2004 | Furukawa et al. | 363/41 |
| 6,751,105 | B2 | 6/2004 | Yamanaka et al. | |
| 8,059,434 | B2 * | 11/2011 | Huang et al. | 363/98 |
| 8,170,171 | B2 * | 5/2012 | Kobayashi | 375/376 |
| 8,395,338 | B2 * | 3/2013 | Kuroda et al. | 318/400.11 |
| 2009/0067205 | A1 * | 3/2009 | Oyobe et al. | 363/98 |

FOREIGN PATENT DOCUMENTS

| JP | 59-139871 | | 8/1984 |
|---|---|---|---|
| JP | 63-290170 | A | 11/1988 |
| JP | 1-274669 | A | 11/1989 |

(Continued)

*Primary Examiner* — Adolf Berhane
*Assistant Examiner* — Lakaisha Jackson
(74) *Attorney, Agent, or Firm* — Foley & Lardner LLP

(57) ABSTRACT

A correction-term adder 1 compares a maximum value max(V*) with an absolute value of a minimum value min(V*). The correction-term adder 1 selects a signal 1−max(V*) when the maximum value max(V*) is larger than the absolute value of the minimum value min(V*), on the other hand, selects a signal −1−min(V*) when the absolute value of the minimum value min(V*) is larger than the maximum value max(V*). Thereby, a signal of correction amount α is calculated. Moreover, the correction-term adder 1 produces a triangular-wave-shaped signal k(max(V*)+min(V*)) by multiplying a gain k by an addition signal max(V*)+min(V*) of the maximum value max(V*) and the minimum value min(V*). This triangular-wave-shaped signal k(max(V*)+min(V*)) is synchronized with the correction amount α. The correction-term adder 1 produces a correction amount β by selecting smaller one in absolute value between the triangular-wave-shaped signal k(max(V*)+min(V*)) and the correction amount α, and adds the correction amount β to the voltage command values $V^*_U$, $V^*_V$, $V^*_W$.

4 Claims, 14 Drawing Sheets

(56) References Cited

FOREIGN PATENT DOCUMENTS

| | | |
|---|---|---|
| JP | 5-199796 A | 8/1993 |
| JP | 2004-48885 A | 2/2004 |
| JP | 2007-151344 | 6/2007 |
| WO | WO 01/65675 A1 | 9/2001 |

* cited by examiner

METHOD OF CONTROLLING POWER CONVERSION DEVICE

TECHNICAL FIELD

The present invention relates to a pulse-width modulation (PWM) control reducing a loss in a power conversion device for converting alternating current into direct current or direct current into alternating current.

BACKGROUND ART

When an on-off operation of a semiconductor switching element, i.e., a switching of the semiconductor switching element is conducted in a power conversion device (for example, a three-phase inverter), a switching loss is caused. In a case that this switching loss is large, is there is a problem such as an efficiency decrease of the power conversion device and an upsizing of the power conversion device because of the necessity of a cooling device for removing a generated heat. Contrary to this, in a case that a switching frequency is lowered in order to reduce the switching loss, a waveform-control performance is reduced due to a decrease of the number of switching operations. That is, a rate of higher harmonics relative to a fundamental wavelength is increased.

As a countermeasure, a two-arm modulation method in which the switching frequency is lowered while suppressing the reduction of waveform-control performance to the minimum is known. In this two-arm modulation method, voltage command values of three phases are corrected to cause one of the voltage command values of the three phases to become greater than or equal to an amplitude value of a triangular-wave carrier. Thereby, a switching of the semiconductor switching element of the one phase is stopped for a certain period, so that an average switching frequency of the three phases is lowered. (see Patent Literature 1)

FIG. 13 is a time chart of voltage command values of three phases and a triangular-wave carrier in the two-arm modulation method. FIG. 14 (a) is a time chart of voltage command values of three phases in a three-arm modulation method. FIG. 14 (b) is a time chart of a correction amount (compensation amount) α which is used in the two-arm modulation method. FIG. 14 (c) is a time chart of voltage command values in the two-arm modulation method. A modulation factor (modulation percentage) of the voltage command value of each phase is denoted by "m".

As shown in FIG. 14 (a), among the voltage command values $V^*_U$, $V^*_V$ and $V^*_W$ of three phases, for example, the voltage command value $V^*_U$ takes a maximum level in an interval (zone) "A", and the voltage command value $V^*_W$ takes a minimum level in an interval "B". In order to suspend the switching of the semiconductor switching element for one phase in these intervals "A" and "B", the correction amount α (waveform of FIG. 14 (b)) is added to each of the voltage command values $V^*_U$, $V^*_V$ and $V^*_W$ of three phases. This correction amount α is calculated by subtracting the voltage command value $V^*_U$ from 1 (i.e., $1-V^*_U$) in the interval "A", and by subtracting the voltage command value $V^*_W$ from −1 (i.e., $-1-V^*_W$) in the interval "B". As a result, as shown by waveforms of $V^*_U+α$, $V^*_V+α$, and $V^*_W+α$ in FIG. 14 (c), the voltage command value of one of the three phases always exceeds or becomes equal to the amplitude value of triangular-wave carrier with a phase change done every interval of 60°. Thereby, the semiconductor switching element of the one phase exceeding or equal to the amplitude value of triangular-wave carrier stops (suspends) its switching operation. Thus, by adding the correction amount α to the voltage command values $V^*_U$, $V^*_V$ and $V^*_W$ of three phases, the voltage command values $V^*_U+α$, $V^*_V+α$, and $V^*_W+α$ for the two-arm modulation method can be produced.

Moreover, Patent Literature 2 discloses a motor control apparatus that performs a changeover between the two-arm modulation method and the three-arm modulation method.

CITATION LIST

Patent Literature

Patent Literature 1: Japanese Patent Application Publication No. 59-139871
Patent Literature 2: Japanese Patent Application Publication No. 2007-151344 (paragraphs [0056]~[0065], FIG. 2, FIG. 4, FIG. 5)

SUMMARY OF THE INVENTION

Technical Problem

When the three-arm modulation method is compared with the two-arm modulation method in a case that each phase is modulated by a triangular-wave carrier having an identical frequency, the two-arm modulation method generates a lower level of switching loss than the three-arm modulation method. Hence, it is more efficient to employ the two-arm modulation method. However, there are the following problems.

At first, a gate signal (switching operations) in the three-arm modulation method will now be compared with a gate signal in the two-arm modulation method in a case that the modulation factor m of the voltage command value of each of three phases is relatively small. FIG. 15 is a view showing a time chart of the voltage command values $V^*_U$, $V^*_V$ and $V^*_W$ and a time chart of a U-phase gate signal $G_U$, in a case that the three-arm modulation method is used when the modulation factor m of each voltage command value is equal to 0.1 (m=0.1). FIG. 16 is a view showing a time chart of the voltage command values $V^*_U+α$, $V^*_V+α$, and $V^*_W+α$ and a time chart of the gate signal $G_U$ of U-phase, in a case that the two-arm modulation method is used when the modulation factor m of each voltage command value is equal to 0.1 (m=0.1).

In the three-arm modulation method shown in FIG. 15, an amplitude of each of voltage command values $V^*_U$, $V^*_V$ and $V^*_W$ is small. Hence, the waveform of the gate signal $G_U$ which is obtained by comparing the voltage command value $V^*_U$ with the triangular wave has every pulse having a large pulse width (on-duty: 45~55%).

On the other hand, in the two-arm modulation method shown in FIG. 16, during an interval for which the switching of semiconductor switching element of one phase (e.g., U-phase) is stopped, the amplitudes of the voltage command values of the other two phases (e.g., V-phase and W-phase) are large. Hence, the gate signal $G_U$ has an interval in which each pulse has a small pulse width (namely, on-duty is lower than or equal to 10%).

In a general power conversion device, in order to prevent the upper and lower-arm semiconductor switching elements of a same phase from becoming in ON-state concurrently with each other, a dead time is applied to the gate signal so as to delay a timing of ON/OFF switching of each semiconductor switching element. However, in the case that the two-arm modulation method is employed, the waveform of gate signal has an interval in which each pulse width (on-duty) becomes smaller if the modulation factor m becomes lower. In this case, the dead time cannot be applied to the ON/OFF operation, so that a voltage error might be caused. Hence, if the modulation factor m of the voltage command value is relatively low, it is preferable to use the three-arm modulation method in order to reduce the voltage error.

Next, the gate signal (switching operations) in the three-arm modulation method will now be compared with the gate signal in the two-arm modulation method in a case that the modulation factor m of the voltage command value of each of three phases is relatively large. FIG. 17 is a view showing a time chart of the voltage command values $V^*_U$, $V^*_V$ and $V^*_W$ and a time chart of the U-phase gate signal $G_U$, in a case that the three-arm modulation method is used when the modulation factor m of each voltage command value is equal to 1 (m=1). FIG. 18 is a view showing a time chart of the voltage command values $V^*_U 30\ \alpha$, $V^*_V+\alpha$, and $V^*_W+\alpha$ and a time chart of the gate signal $G_U$ of U-phase, in a case that the two-arm modulation method is used when the modulation factor m of each voltage command value is equal to 1 (m=1).

In the three-arm modulation method shown in FIG. 17, the pulse width (on-duty) of the gate signal $G_U$ becomes extremely small during an interval for which the voltage command value $V^*_U$ of U-phase is small. On the other hand, in the two-arm modulation method shown in FIG. 18, the gate signal $G_U$ has an interval for which the switching is stopped, and has the other intervals for which each pulse has a certain level of pulse width. That is, the gate signal $G_U$ in the two-arm modulation method shown in FIG. 18 has no interval in which the pulse width is extremely small as the case of gate signal $G_U$ of the three-arm modulation method shown in FIG. 17.

Therefore, when the modulation factor m of the voltage command value is large, the two-arm modulation method attains a higher voltage accuracy than the three-arm modulation method because the two-arm modulation method is less influenced by the voltage error due to the application of dead time. Moreover, since an average switching frequency of the two-arm modulation method is lower than that of the three-arm modulation method, an efficiency of the two-arm modulation method is favorable. However, since the average switching frequency of the two-arm modulation method is lower than that of the three-arm modulation method, there is a problem of noise.

Hence, an idea is conceivable that the modulation mode is switched (changed) from the two-arm modulation method to the three-arm modulation method when the modulation factor m of the voltage command value is small, and then, the modulation mode is switched (changed) from the three-arm modulation method to the two-arm modulation method when the modulation factor m of the voltage command value is large. However, a simple changeover between these two modulation methods might cause a problem that the noise is suddenly changed due to a sudden change of the average switching frequency.

Moreover, the above-mentioned Patent Literature 2 discloses the changeover of modulation methods, but cannot solve the above problem that is caused due to the difference between modulation factors of the voltage command value.

As explained above, in the field of power conversion device, it is an object to suppress the switching loss while improving the voltage accuracy and to suppress a sudden change in noise that is caused due to the changeover between modulation methods.

Solution to Problem

According to the present invention, there is provided a method of controlling a power conversion device for converting alternating current into direct current or direct current into alternating current, wherein the power conversion device is configured to output a gate signal to a semiconductor switching element provided in the power conversion device, wherein the gate signal is obtained by a gate-signal generating section configured to apply a pulse-width modulation to a voltage command value, characterized in that the method comprises steps of: comparing a maximum value among the voltage command values of multiple phases with an absolute value of a minimum value among the voltage command values of the multiple phases in a correction-term adder provided in the gate-signal generating section; calculating a first correction amount in the correction-term adder by selecting a signal obtained by subtracting the maximum value among the voltage command values from a maximum value of a triangular-wave carrier if the maximum value among the voltage command values is larger than the absolute value of the minimum value, and selecting a signal obtained by subtracting the minimum value among the voltage command values from a minimum value of the triangular-wave carrier if the absolute value of the minimum value is larger than the maximum value among the voltage command values; producing a triangular-wave-shaped signal in the correction-term adder by multiplying a gain by an addition signal of the maximum value among the voltage command values and the minimum value, wherein the triangular-wave-shaped signal is synchronized with the first correction amount; producing a second correction amount in the correction-term adder by selecting smaller one in absolute value between the triangular-wave-shaped signal and the first correction amount; calculating corrected voltage command values in the correction-term adder by adding the second correction amount respectively to the voltage command values of the multiple phases; obtaining the gate signal by the pulse-width modulation of each of the corrected voltage command values; and outputting the gate signal to the semiconductor switching element.

Moreover, one aspect of the above method of controlling a power conversion device according to the present invention is characterized in that the gain varies according to a modulation factor of the voltage command values.

Moreover, one aspect of the above method of controlling a power conversion device according to the present invention is characterized in that the triangular-wave-shaped signal synchronized with the first correction amount is produced by multiplying a load factor by the multiplication of the gain and the addition signal of the maximum value among the voltage command values and the minimum value.

Moreover, one aspect of the above method of controlling a power conversion device according to the present invention is characterized in that an attenuation of harmonic components and a suppression of time rate of change have been applied to the load factor by a low-pass filter and a soft-start circuit.

Advantageous Effects of Invention

As is clear from the above explanations, according to the present invention, the modulation method can be varied continuously from the three-arm modulation method to the two-arm modulation method as the modulation factor of the voltage command value becomes large. That is, the three-arm modulation method is employed when the modulation factor is small, and the two-arm modulation method is gradually employed as the modulation factor becomes larger.

Moreover, since the two-arm modulation method can be combined with the three-arm modulation method according to the present invention, the noise can be reduced as compared with the case that only the two-arm modulation method is used. Furthermore, a sudden change of the noise can be suppressed, as compared with the case to that the modulation method is simply switched to the three-arm modulation method when the modulation factor of voltage command value is small and the modulation method is simply switched to the two-arm modulation method when the modulation factor of voltage command value is large.

In addition, when the modulation factor of voltage command value is large, the waveform similar to that of the two-arm modulation method can be obtained. Hence, suspend intervals of the switching are generated, so that the switching loss can be reduced.

DESCRIPTION OF EMBODIMENTS

[First Embodiment]

Figure 1:
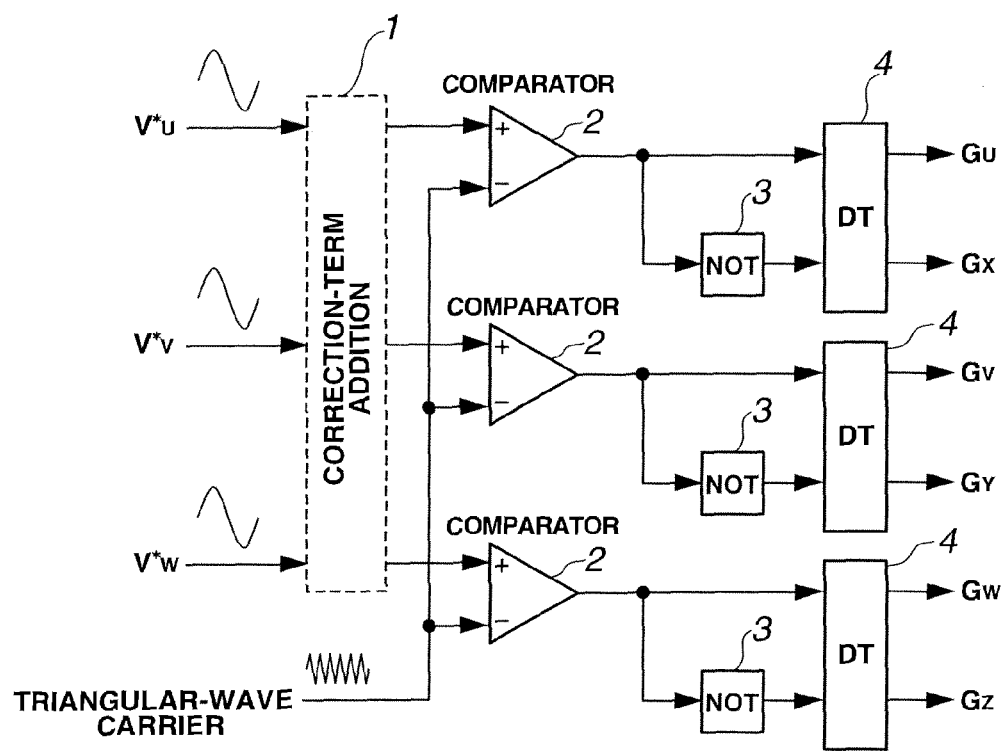
[FIG. 1] A configuration view showing one example of a gate-signal generating section according to first and second embodiments.
Figure 2:
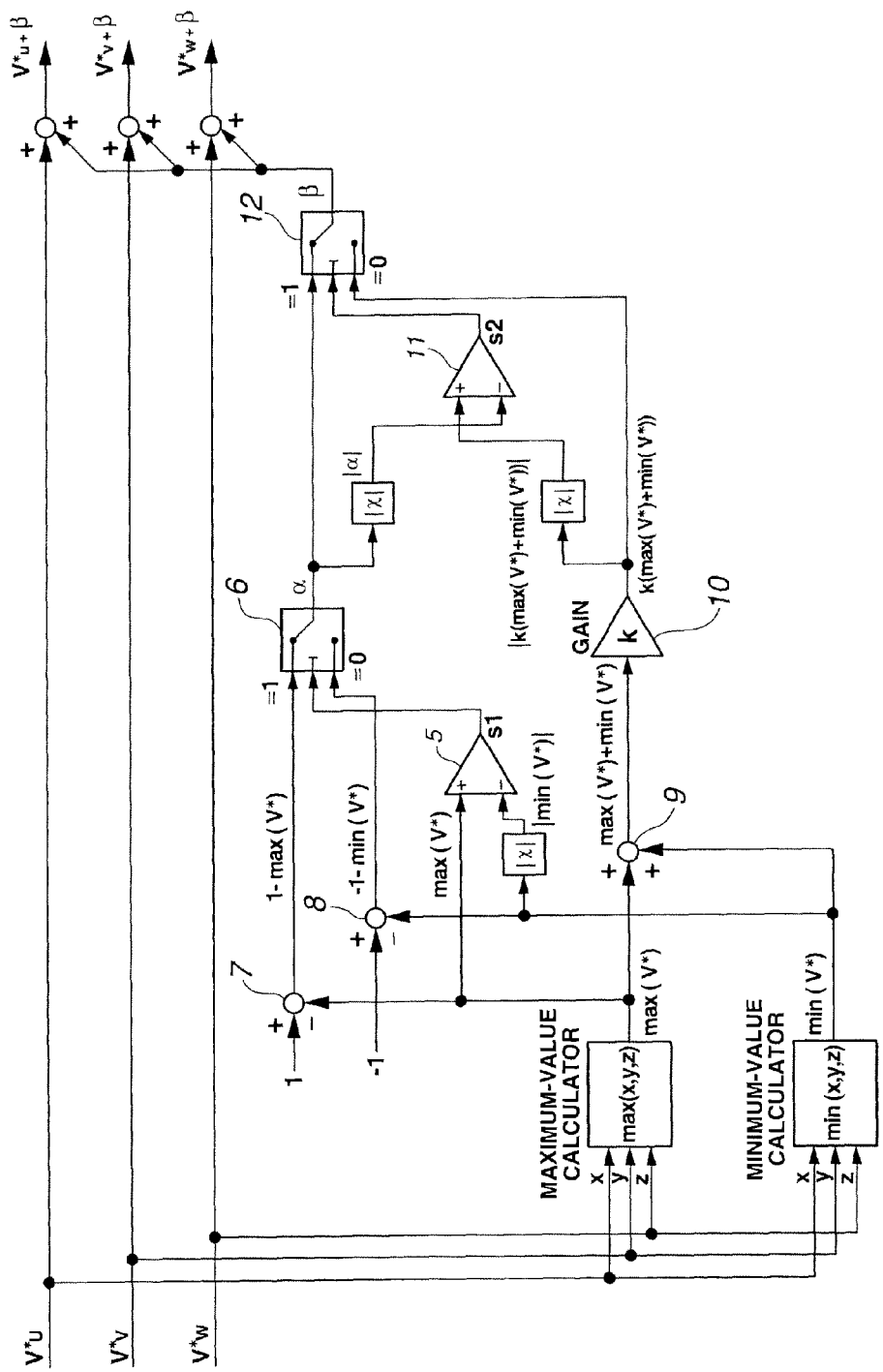
[FIG. 2] A configuration view showing one example of a correction-term adder 1 according to the first and second embodiments.

Voltage command values $V^*_U$, $V^*_V$ and $V^*_W$ of three phases are inputted to a gate-signal generating section shown in FIG. 1. This gate-signal generating section outputs gate signals to semiconductor switching elements provided in a power conversion device (for example, a three-phase inverter) for performing an AC-to-DC conversion or DC-to-AC conversion. Each of the gate signals is obtained by applying a pulse-width modulation (PWM) to the voltage command value. A correction-term adder 1 adds a second correction amount (hereinafter referred to as, correction amount β) to each of the voltage command values $V^*_U$, $V^*_V$ and $V^*_W$ of three phases, and thereby produces corrected voltage command values $V^*_U+\beta$, $V^*_V+\beta$ and $V^*_W+\beta$, as shown in FIG. 2. Then, the correction-term adder 1 outputs the corrected voltage command values $V^*_U\beta$, $V^*_V+\beta$ and $V^*_W+\beta$ respectively to comparators 2. Since operations of a NOT-circuit 3 and a dead-time generating circuit 4 provided downstream of the comparator 2 in FIG. 1 are known, detailed explanations thereof will be omitted from the following disclosures.

Next, operations in the correction-term adder 1 will be explained referring to FIG. 2.

At first, a calculation process for the first correction amount (hereinafter referred to as, correction amount α) which serves to calculate the voltage command values $V^*_U+\alpha$, $V^*_V+\alpha$, and $V^*_W+\alpha$ of the two-arm modulation method will now be explained.

A maximum-value calculating unit max(x, y, z) receives the voltage command values $V^*_U$, $V^*_V$ and $V^*_W$, and selects a maximum one of these voltage command values $V^*_U$, $V^*_V$ and $V^*_W$. Then, the maximum-value calculating unit max(x, y, z) outputs the selected maximum value max(V*). In the same manner, a minimum-value calculating unit min(x, y, z) receives the voltage command values $V^*_U$, $V^*_V$ and $V^*_W$, and selects a minimum one of these voltage command values $V^*_U$, $V^*_V$ and $V^*_W$. Then, the minimum-value calculating unit min(x, y, z) outputs the selected minimum value min(V*). A comparator 5 compares the maximum value max(V*) with an absolute value |min(V*)| of the minimum value min(V*). If the maximum value max(V*) is greater than the absolute value |(min(V*)|, the comparator 5 sets a signal s1 at 1 and outputs the signal s1 (s1=1) to a switch 6. If the absolute value |min(V*)| is greater than the maximum value max(V*), the comparator 5 sets the signal s1 at 0 and outputs the signal s1 (s1=0) to the switch 6. The signal s1 is used for a judgment of the switch 6.

The maximum value max(V*) and the minimum value min(V*) which are outputted from the maximum-value calculating unit max(x, y, z) and the minimum-value calculating unit min(x, y, z) are also inputted to each of a subtractor 7 and a subtractor 8. The subtractor 7 subtracts the maximum value max(V*) from 1 (i.e., 1−max(V*)), and then, outputs this calculated signal to the switch 6.

Figure 14:
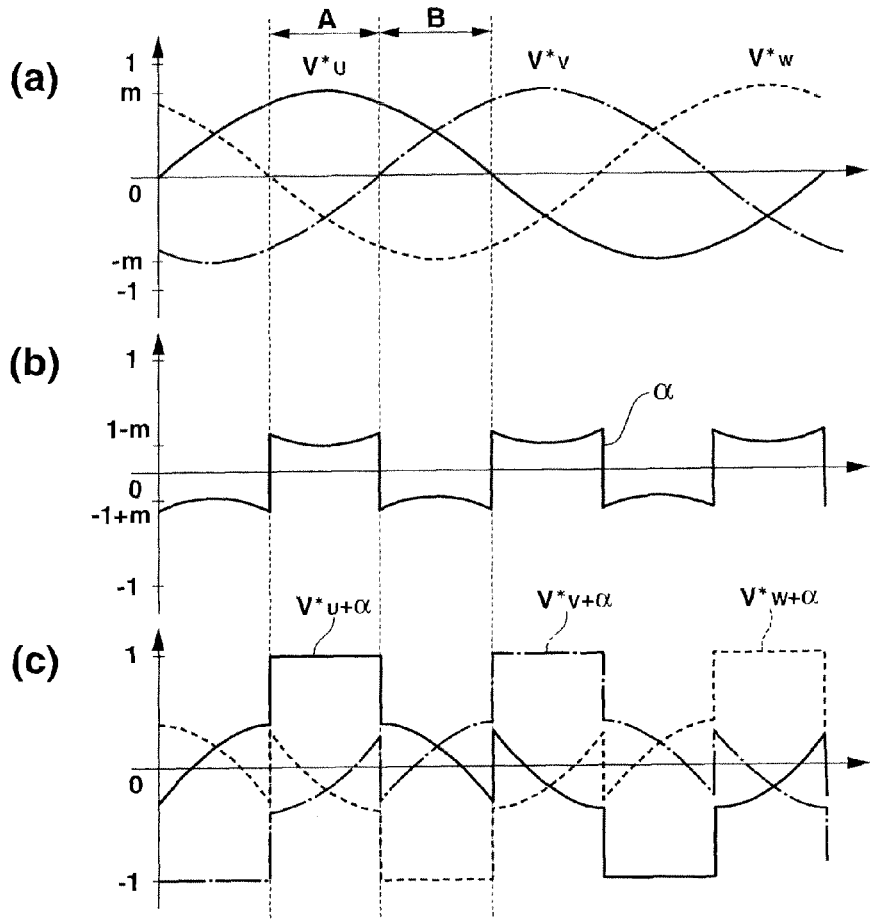
[FIG. 14] A time chart showing one example of voltage command values of the three-arm modulation method and showing one example of the correction amount and the three-phase voltage command values which are used in the two-arm modulation method.

The subtractor 8 subtracts the minimum value min(V*) from −1 (i.e., −1−min(V*)), and then, outputs this calculated signal to the switch 6. The switch 6 selects the signal 1−max (V*) when the signal s1 inputted from the comparator 5 is equal to 1 (i.e., s1=1). On the other hand, the switch 6 selects the signal −1−min(V*) when the signal s1 is equal to 0 (i.e., s1=0). Then, the switch 6 outputs the selected signal as the correction amount α. A waveform of this correction amount α outputted from the switch 6 corresponds to the waveform of correction amount α shown in FIG. 14 (*b*) which is used for the two-arm modulation method.

The calculation process for the correction amount α that has been explained above is just one example. That is, according to this embodiment, the correction amount α may be calculated by the other calculation process.

Next, a calculation process for the correction amount β which serves to calculate the voltage command values V*$_U$+β, V*$_V$+β and V*$_W$+β in the first embodiment will now be explained.

The maximum value max(V*) derived from the maximum-value calculating unit max(x, y, z) is added to the minimum value min(V*) derived from the minimum-value calculating unit min(x, y, z) by an adder 9. A gain multiplier 10 multiplies this addition-result signal max(V*) +min(V*) by a gain k. Then, the gain multiplier 10 outputs this result signal k(max (V*)+min(V*)).

Next, a comparator 11 receives an absolute value |α| of the correction amount α derived from the switch 6 and an absolute value |k(max(V*)+min(V*))| of the signal k(max(V*)+ min(V*)) derived from the gain multiplier 10. Then, the comparator 11 compares the absolute value |α| with the absolute value |k(max(V*)+min(V*))|. If the absolute value |k(max (V*)+min(V*))| is greater than the absolute value |α|, the comparator 11 sets a signal s2 at 1 and outputs the signal s2 (s2=1) to a switch 12. If the absolute value |α| is greater than the absolute value |k(max(V*)+min(V*))|, the comparator 11 sets the signal s2 at 0 and outputs the signal s2 (=0) to the switch 12. The signal s2 is used for a judgment of the switch 12.

The switch 12 receives the correction amount α outputted from the switch 6 and the signal k(max(V*)+min(V*)) outputted from the gain multiplier 10. The switch 12 selects the correction amount α when the signal s2 outputted from the comparator 11 is equal to 1 (s2=1). On the other hand, the switch 12 selects the signal k(max(V*)+min(V*)) when the signal s2 is equal to 0 (s2=0). By so doing, an operation can be achieved that selects smaller one in absolute value between the correction amount α and the signal k(max(V*)+min (V*)).

At last, the signal derived from the switch 12 is added to each of the voltage command values V*$_U$, V*$_V$ and V*$_W$ of the three phases as the correction amount β that is used in a modulation method of the first embodiment. Thus, the corrected voltage command values V*$_U$+β, V*$_V$+β and V*$_W$+β are calculated. This is a principle of correction of the voltage command value according to the first embodiment.

Figure 3:
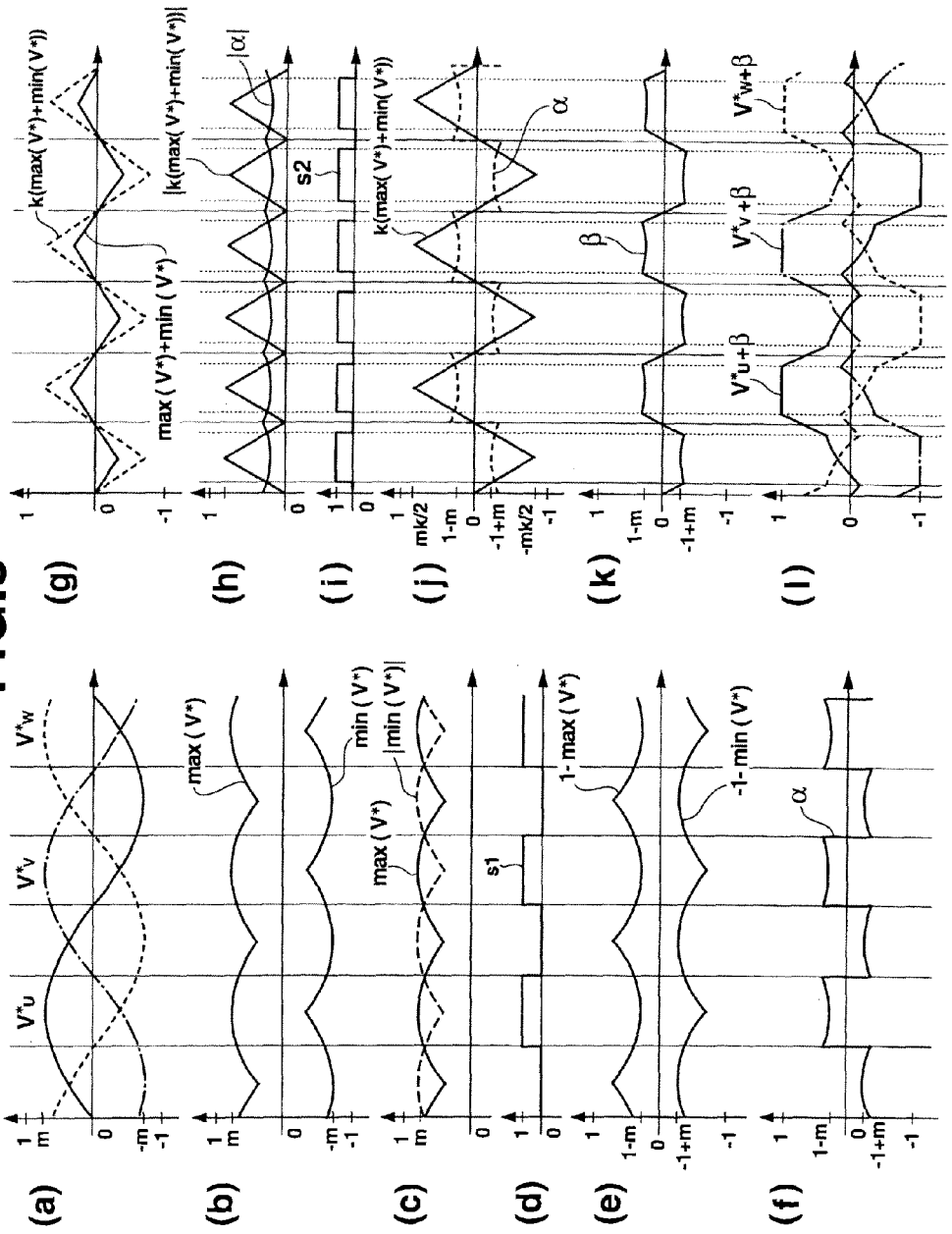
[FIG. 3] A time chart showing one example of signal waveforms of respective parts of the correction-term adder 1.

The correction-term adder 1 of FIG. 2 will now be explained referring to time charts of FIG. 3 showing signal waveforms of respective parts of the correction-term adder 1 as one example.

FIG. 3 (*a*) is a time chart showing one example of the three-phase voltage command values V*$_U$, V*$_V$ and V*$_W$, wherein m denotes the modulation factor. The maximum value max(V*) and the minimum value min(V*) as shown by a time chart of FIG. 3 (*b*) are calculated from the three-phase voltage command values V*$_U$, V*$_V$ and V*$_W$ by the maximum-value calculating unit max(x, y, z) and the minimum-value calculating unit min(x, y, z). Then, the maximum value max(V*) is compared with the minimum-value absolute value |min(V*)| by the comparator 5, as shown in FIG. 3 (*c*). As shown in FIG. 3 (*d*), the signal s1 which is outputted from the comparator 5 is equal to 1 when the maximum value max(V*) is larger than the absolute value |min(V*)|, and is equal to 0 when the absolute value |min(V*)| is larger than the maximum value max(V*).

The signal 1−max(V*) outputted from the subtractor 7 and the signal −1−min(V*) outputted from the subtractor 8 have waveforms respectively shown in FIG. 3 (*e*). Then, the switch 6 selects the signal −1−min(V*) when the signal s1 is equal to 0, and selects the signal 1−max(V*) when the signal s1 is equal to 1. Thereby, the correction amount α is outputted as shown in FIG. 3 (*f*).

On the other hand, the signal max(V*)+min(V*) outputted from the adder 9 has a triangular waveform synchronized with the correction amount α, as shown in FIG. 3 (*g*). The signal k(max(V*)+min(V*)) obtained by multiplying the signal max(V*)+min(V*) by the gain k in the gain multiplier 10 also has a waveform synchronized with the correction amount α.

Then, the comparison between the absolute value |α| of the correction amount α and the absolute value |k(max(V*)+min (V*))| of the signal k(max(V*)+min(V*)) is carried out by the comparator 11 as shown in FIG. 3 (*h*). As shown in FIG. 3 (*i*), the signal s2 outputted from the comparator 11 is equal to 1 when the absolute value |k(max(V*)+min(V*))| is larger than the absolute value |α|, and is equal to 0 when the absolute value |α| is larger than the absolute value |k(max(V*)+min(V*))|.

Moreover, the signal k(max(V*)+min(V*)) and the correction amount α have respective waveforms shown in FIG. 3 (*j*). Then, the switch 12 selects the correction amount α when the signal s2 is equal to 1 (s2=1), and selects the signal k(max (V*)+min(V*)) when the signal s2 is equal to 0 (s2=0). Thereby, the correction amount β is outputted as shown in FIG. 3 (*k*).

At last, the correction amount β that is used for the modulation method of the first embodiment is added to each of the voltage command values V*$_U$, V*$_V$ and V*$_W$. Thereby, the corrected voltage command values V*$_U$+β, V*$_V$+β and V*$_W$+β are obtained as shown in FIG. 3 (*l*). Thus, the correction-term adder 1 of FIG. 1 is configured as shown in FIG. 2, and the gate signal is produced by the comparison with triangular wave. By this gate signal, the ON/OFF operation of each switching element is conducted.

Next, a relation among the modulation factor m, the gain k, the voltage command values V*$_U$, V*$_V$ and V*$_W$, the correction amount α and the correction amount β will now be explained referring to FIG. 4.

Figure 4:
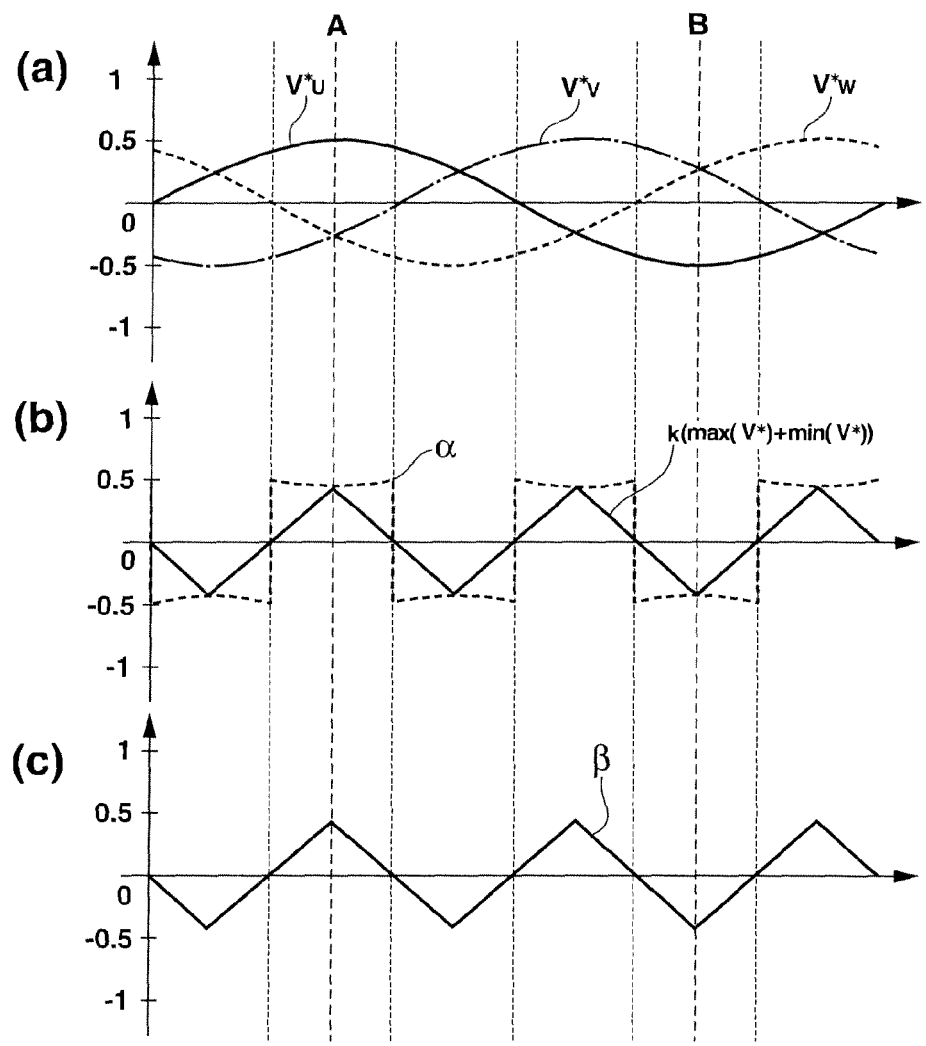
[FIG. 4] A time chart showing one example of voltage command values, k(max(V*)+min(V*)), and correction amounts α and β in a three-arm modulation method.

FIG. 4 (*a*) is a time chart of the voltage command values V*$_U$, V*$_V$ and V*$_W$ when the modulation factor m is equal to 0.5 (m=0.5). FIG. 4 (*b*) is a time chart of the correction amount α and the signal k(max(V*)+min(V*)) when the gain k is equal to 2 (k=2) and the modulation factor m is equal to 0.5 (m=0.5). FIG. 4 (*c*) is a time chart of the correction amount β when the gain k is equal to 2 (k=2) and the modulation factor m is equal to 0.5 (m=0.5).

Under the condition where the gain k is equal to 2 (k=2) and where the modulation factor m is equal to 0.5 (m=0.5), the signal k(max(V*)+min(V*)) takes its maximum value at a point A at which the U-phase voltage command value V*$_U$ of FIG. 4 (*a*) takes its maximum value.

This maximum value of the signal k(max(V*)+min(V*)) can be calculated by a following formula (1).

[Formula 1]

$$\frac{m \cdot k}{2} = 0.5 \quad (1)$$

Moreover, a value of the correction amount α at the point A can be calculated by a following formula (2).

[Formula 2]

$$1 - m = 0.5 \quad (2)$$

The correction amount β shown in FIG. 4 (c) is obtained from the correction amount α and the signal k(max(V*)+min(V*)) by selecting smaller one between the absolute values of the correction amount α and the signal k(max(V*)+min(V*)) in the switch 12. The relation between the correction amount α and the signal k(max(V*) +min(V*)) at the point A is represented by a following formula (3) or a following formula (4). That is, when the modulation factor m is smaller than or equal to 0.5 (m≤0.5), the relation of the following formula (3) is satisfied so that the signal k(max(V*)+min(V*)) is selected as the correction amount β.

[Formula 3]

$$\frac{m \cdot k}{2} \leq 1 - m \quad (3)$$

On the other hand, when the modulation factor m is larger than 0.5 (m>0.5), the relation of the following formula (4) is satisfied so that a minimum amplitude value of the correction amount α is selected as the correction amount β at the point A.

[Formula 4]

$$\frac{m \cdot k}{2} > 1 - m \quad (4)$$

Moreover, since each signal at a point B merely has a sign opposite to that at the point A, the relation of the formula (3) or (4) is satisfied also at the point B. The phases other than the U-phase are similar as the case of U-phase.

As mentioned above, the correction amount β is obtained by selecting smaller one in absolute value between the correction amount α and the signal k(max(V*) +min(V*)). If this calculation is carried out for one period of phase under the condition where the gain k is equal to 2 (k=2) and the modulation factor m is larger than 0.5 (m>0.5); the signal k(max (V*)+min(V*)) is selected in regions (intervals) near zero-cross points, and the correction amount α is selected in the other regions (intervals) as the correction amount β, as shown in FIG. 3 (k).

From the above explanations, it is understood that the relation between the minimum amplitude value of the correction amount α and the peak of the signal k(max(V*)+min (V*)) can be freely varied by varying the gain k. Accordingly, a rate between the two-arm modulation method and the three-arm modulation method can be controlled.

Figure 5:
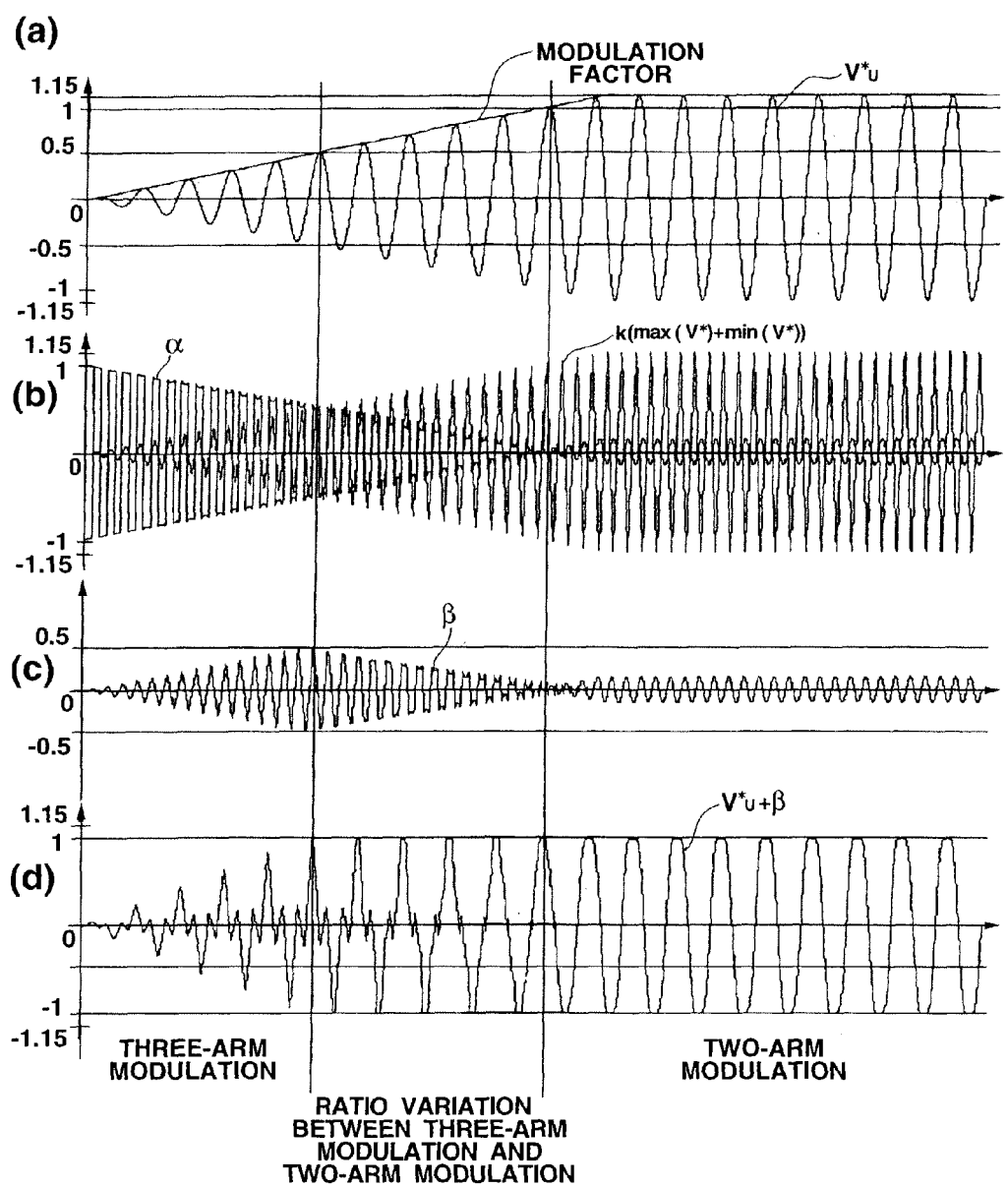
[FIG. 5] A time chart showing one example of the respective signal waveforms in a case that a modulation factor m of the voltage command value is increased in the first embodiment.

Next, a variation of the corrected voltage command value V*$_U$+β of the U-phase will now be explained in a case that the modulation factor m is increased from 0 to 1.15 with a constant gradient. FIG. 5 (a) is a time chart of the U-phase voltage command value V*$_U$ when the modulation factor m is increased from 0 to 1.15 with the constant gradient. FIG. 5 (b) is a time chart of the correction amount α and the signal k(max(V*)+min(V*)). FIG. 5 (c) is a time chart of the correction amount β. FIG. 5 (d) is a time chart of the corrected voltage command value V*$_U$+β of U-phase in the first embodiment. The gain k is equal to 2 (k=2).

As shown in FIGS. 5(a) and 5(b), the amplitude of the correction amount α of the two-arm modulation method becomes smaller as the modulation factor m of the voltage command value V*$_U$ becomes larger. On the other hand, the amplitude of the signal k(max(V*)+min(V*)) becomes larger as the modulation factor m of the voltage command value V*$_U$ becomes larger.

In a region (interval) where the modulation factor m is smaller than or equal to 0.5 (m≤0.5), the signal k(max(V*)+ min(V*)) is equal to the correction amount α at zero-cross points and is smaller in absolute value than or equal to the correction amount α, as shown in FIGS. 4(b) and 5(b). Hence, if smaller one in absolute values of the correction amount α and the signal k(max(V*)+min(V*)) is selected as the correction amount β, whole of the signal k(max(V*)+min(V*)) is selected as the correction amount β.

In a region (interval) where the modulation factor m is larger than 0.5 (m>0.5), absolute values of the maximum and minimum values of the signal k(max(V*) +min(V*)) are larger than the absolute value of the correction amount α. Hence, if smaller one in absolute value from the correction amount α and the signal k(max(V*)+min(V*)) is selected, the correction amount α which is used for the two-arm modulation method and the signal k(max(V*)+min(V*)) are mixed in values of the correction amount β.

As the modulation factor m becomes further larger, a rate of selecting of the correction amount a (which is used for the two-arm modulation method) as the correction amount β is more increased. When the modulation factor m is equal to 1.15; whole of the correction amount α is selected as the correction amount β, i.e., the correction amount β is constituted only by the signal of correction amount α. At this time, the two-arm modulation method is completely performed.

Since such a correction amount β is added respectively to the voltage command values V*$_U$, V*$_V$ and V*$_W$, the modulation method can be varied continuously (gradually) from the three-arm modulation method to the two-arm modulation method with the increase of the modulation factor m.

Next, a pulse waveform of the gate signal G$_U$ will now be explained in the case that the modulation method according to the first embodiment is used.

Figure 6:
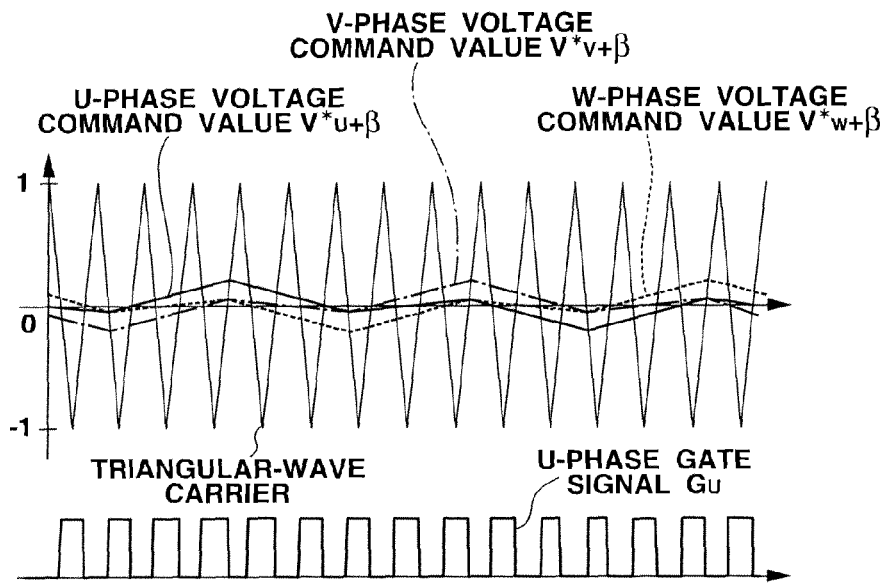
[FIG. 6] A time chart showing one example of a corrected voltage command value $V^*_U+\beta$ and a U-phase gate signal $G_U$ in a case that a modulation method according to the first embodiment is used when the modulation factor m of the voltage command value is equal to 0.1.
Figure 7:
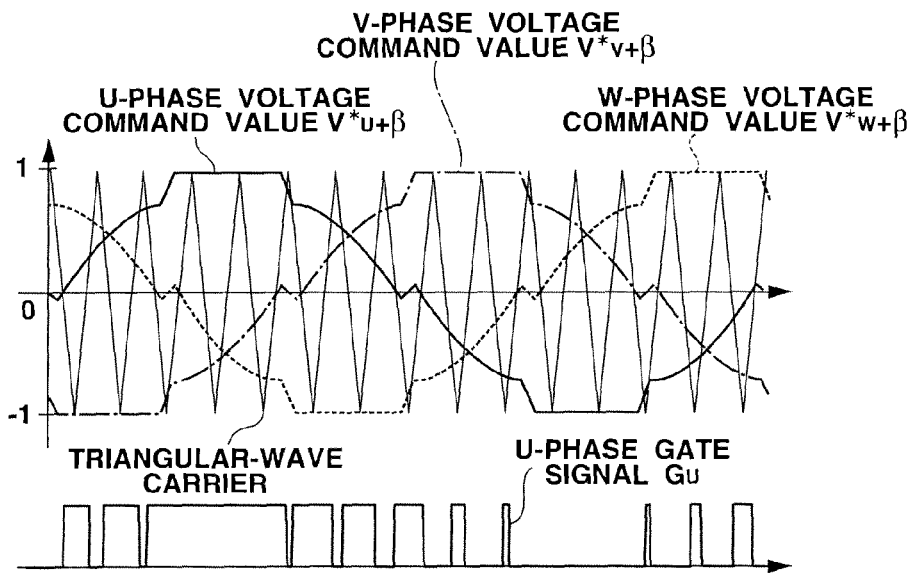
[FIG. 7] A time chart showing one example of the corrected voltage command value $V^*_U+\beta$ and the U-phase gate signal $G_U$ in a case that the modulation method according to the first embodiment is used when the modulation factor m of the voltage command value is equal to 1.

FIG. 6 is a time chart of the corrected voltage command values V*$_U$+β, V*$_V$+β and V*$_W$+β and the U-phase gate signal G$_U$ in the case that the modulation method according to the first embodiment is used when the modulation factor m of each voltage command value is equal to 0.1 (m=0.1). FIG. 7 is a time chart of the corrected voltage command values V*$_U$+β, V*$_V$+β and V*$_W$+β and the U-phase gate signal G$_U$ in the case that the modulation method according to the first embodiment is used when the modulation factor m of each voltage command value is equal to 1 (m=1). The gain k is equal to 2 (k=2).

Figure 15:
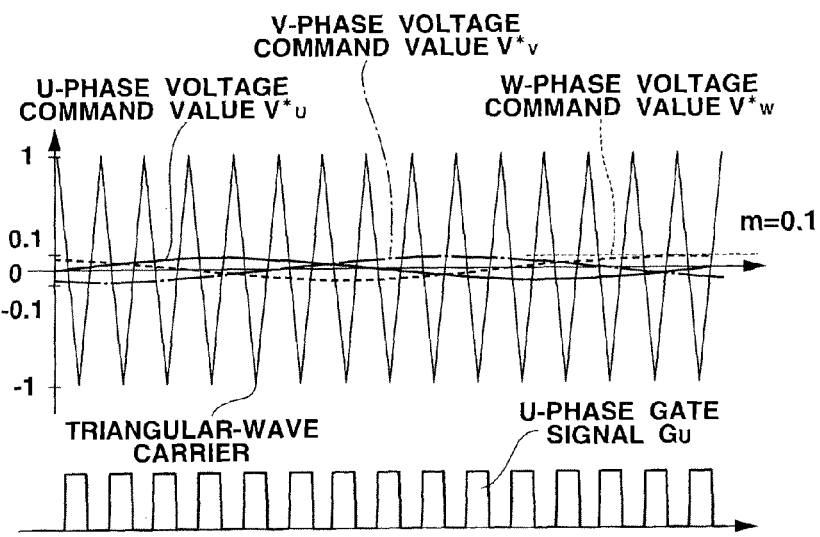
[FIG. 15] A time chart showing one example of the voltage command values and the gate signal in a case that the three-arm modulation method is used when the modulation factor m of the voltage command value is equal to 0.1.
Figure 16:
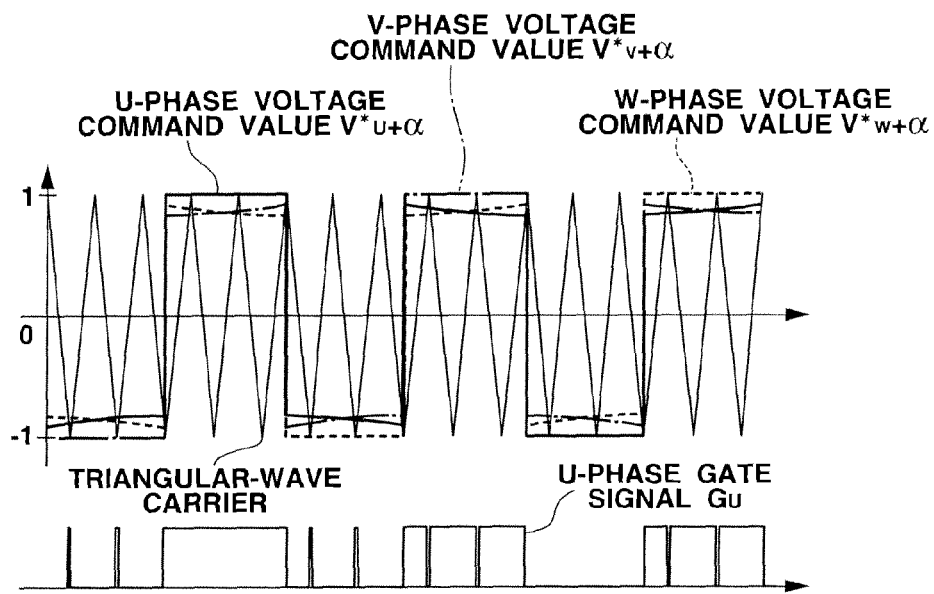
[FIG. 16] A time chart showing one example of the voltage command values and the gate signal in a case that the two-arm modulation method is used when the modulation factor m of the voltage command value is equal to 0.1.
Figure 17:
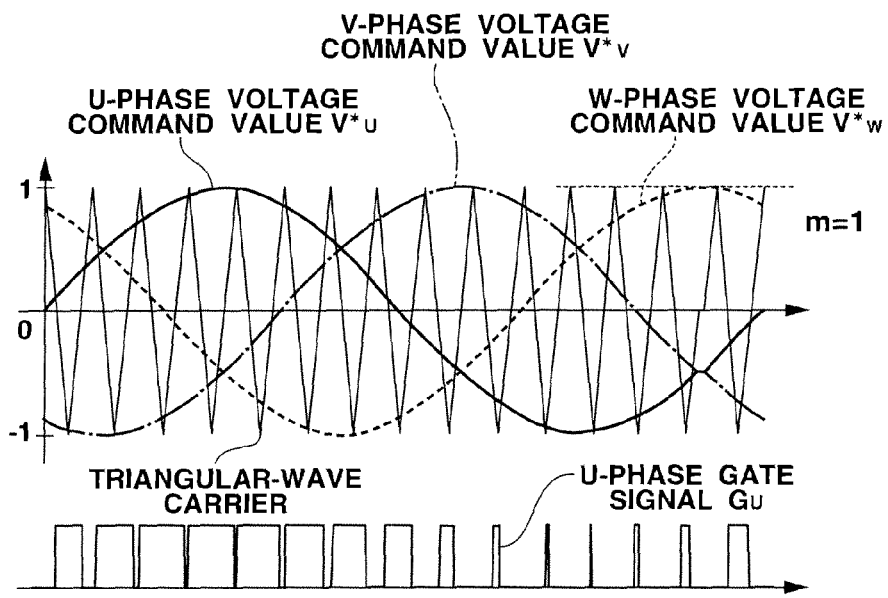
[FIG. 17] A time chart showing one example of the voltage command values and the gate signal in a case that the three-arm modulation method is used when the modulation factor m of the voltage command value is equal to 1.
Figure 18:
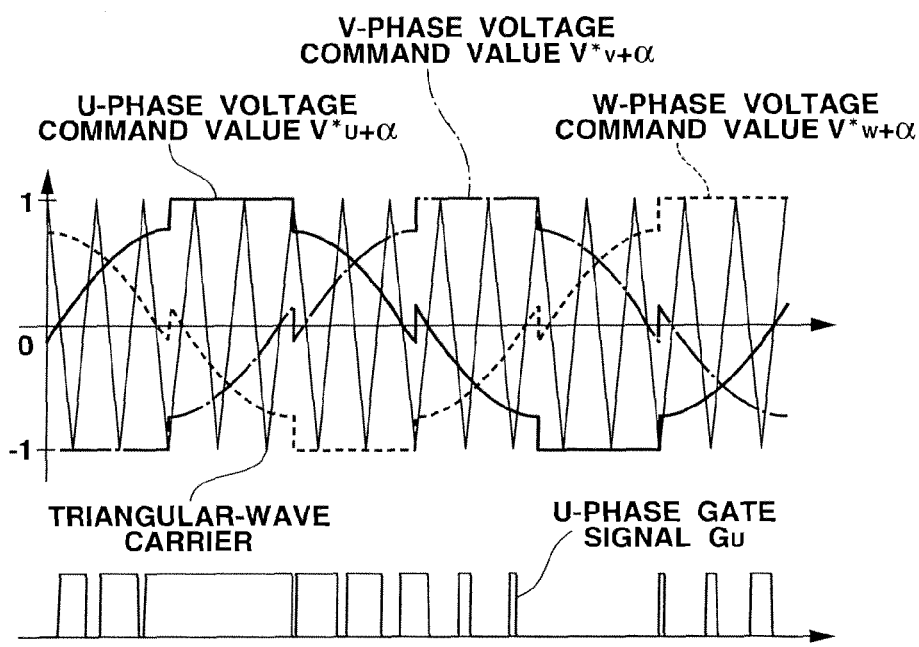
[FIG. 18] A time chart showing one example of the voltage command values and the gate signal in a case that the two-arm modulation method is used when the modulation factor m of the voltage command value is equal to 1.

In the modulation method of the first embodiment under the condition where the modulation is factor m is equal to 0.1, the wave shape of the U-phase gate signal G$_U$ has no pulse having a narrow pulse width (small on-duty) as shown in FIG. 6, in the same manner as the three-arm modulation method shown in FIG. 15. In the modulation method of the first embodiment under the condition where the modulation factor m is equal to 1 as shown in FIG. 7, the wave shape of the U-phase gate signal G$_U$ has no pulse having a pulse width narrow enough to cause the voltage error due to no execution of ON/OFF operation because of dead time, in the same manner as the two-arm modulation method shown in FIG. 18. Moreover, in this case, the switching loss can be reduced since the switching is suspended for some time.

Since the correction-term adder 1 is constructed as the first embodiment, the modulation method can be varied continuously (not rapidly) from the three-arm modulation method to the two-arm modulation method as the modulation factor m of the voltage command value becomes large. That is, the three-arm modulation method is employed when the modulation factor m is small, and the two-arm modulation method is gradually employed as the modulation factor m becomes larger.

Moreover, in the modulation method according to the first embodiment, the two-arm modulation method is combined with the three-arm modulation method. Hence, the noise can be reduced as compared with the case that only the two-arm modulation method is used. Furthermore, a sudden change of the noise can be suppressed, as compared with the case that the three-arm modulation method is simply employed when the modulation factor m of the voltage command value is small and the two-arm modulation method is simply employed when the modulation factor m of the voltage command value is large.

Moreover, when the modulation factor m of the voltage command value is large, the gate signal comes to have a wave shape similar as that of the two-arm modulation method so that the time durations for which the switching is stopped can be obtained. Accordingly, the switching loss can be reduced.

Additionally, in this embodiment, a complicated calculation is unnecessary such as a calculation for modulation method which applies a polar coordinate conversion to the voltage command values of three phases so as to obtain phase and amplitude information. That is, without such complicated calculations, by means of an easy analog circuit or easy digital circuit such as FPGA, a direct correction from the voltage command values $V^*_U$, $V^*_V$ and $V^*_W$ of three phases is possible.

[Second Embodiment]

In the modulation method of the first embodiment, the correction amount β is added to the three-phase voltage command values $V^*_U$, $V^*_V$ and $V^*_W$. Thereby, a zero-phase voltage (i.e., a voltage to ground) is varied. However, the variation of the voltage to ground is increased, a leakage current become problematic.

Therefore, in a second embodiment according to the present invention, the gain k of the modulation method of the first embodiment is varied according to the modulation factor m.

Figure 8:
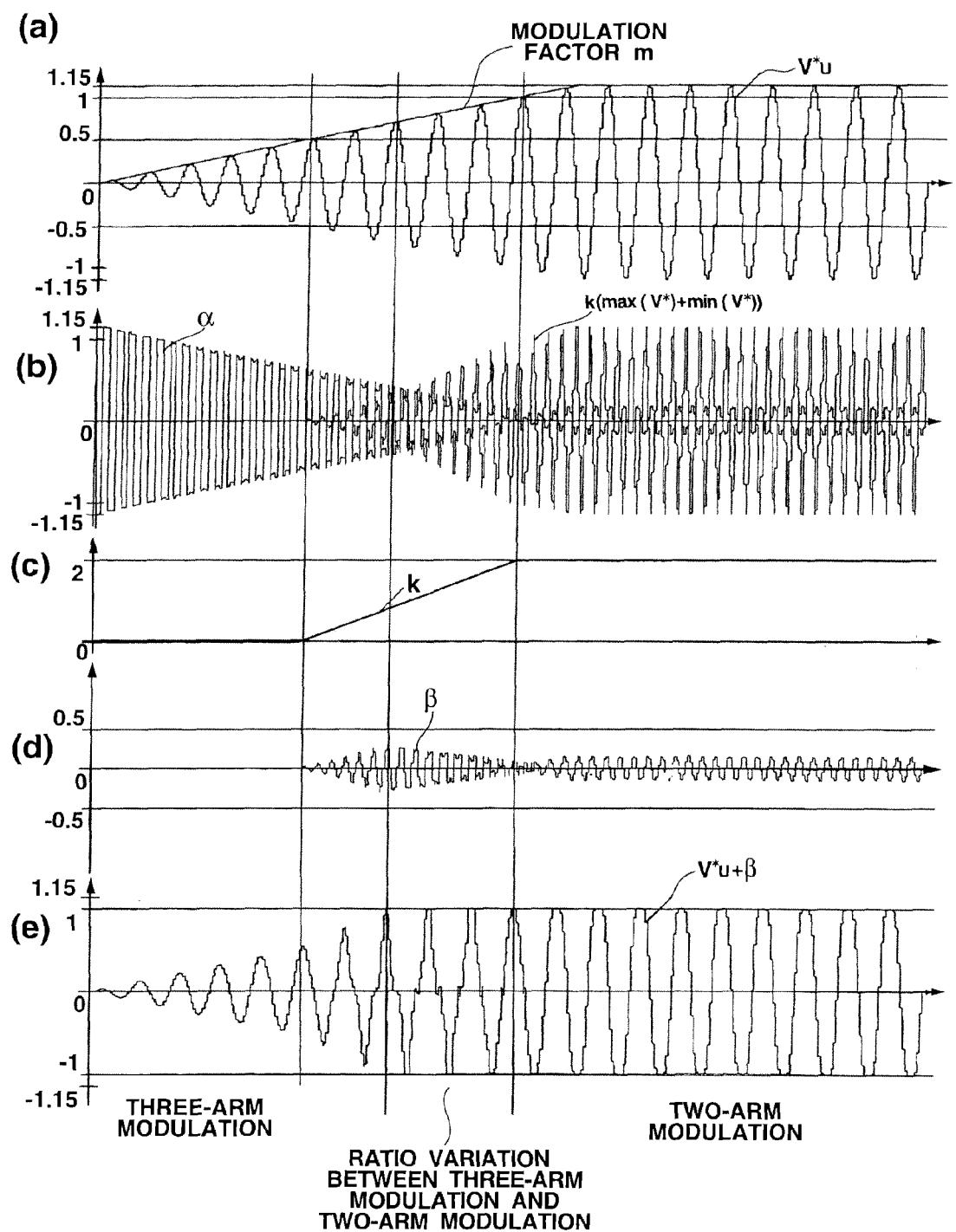
[FIG. 8] A time chart showing one example of the respective signal waveforms in a case that the modulation factor m of the voltage command value is increased in the second embodiment.

A concrete example of the case where gain k is varied according to the modulation factor m will now be explained. FIG. 8 (*a*) is a time chart of the U-phase voltage command value $V^*_U$ in a case that the modulation factor m is increased from 0 to 1.15 with a constant gradient. FIG. 8 (*b*) is a time chart of the correction amount α and the signal k(max(V*)+min(V*)). FIG. 8 (*c*) is a time chart of the gain k. FIG. 8 (*d*) is a time chart of the correction amount β. FIG. 8 (*e*) is a time chart of the corrected voltage command value $V^*_U+β$ of U-phase in the second embodiment.

As shown in FIG. 8 (*c*), in a region over which the three-arm modulation method is employed (i.e., in an interval for which the modulation factor m of the voltage command value is small), the gain k remains equal to 0 (k=0). Then, when the modulation factor m becomes equal to 0.5 (m=0.5), the gain k starts to be increased with a constant gradient. In this example, the gain k is increased so as to cause the gain k to become equal to 2 (k=2) when the modulation factor m of the voltage command value has just become equal to 1 (i.e., the region of two-arm modulation method). After the time point when the modulation factor m has just become equal to 1, the level of the gain k is maintained even if the modulation factor m increases.

Thus, since the gain k is weighted according to the modulation factor m, a complete three-arm modulation can be achieved in an interval for which the modulation factor m is low. Moreover, in this second embodiment, the amplitude value of the correction amount β can be suppressed as compared with the first embodiment, so that the leakage current can be reduced.

Moreover, the modulation method according to the second embodiment produces advantageous effects similar as those of the first embodiment.

[Third Embodiment]

In the second embodiment, the mixture ratio between the three-arm modulation method and the two-arm modulation method is varied in accordance with a magnitude of the modulation factor m. However, in a third embodiment according to the present invention, the mixture ratio between the three-arm modulation method and the two-arm modulation method is varied in accordance with not only the modulation factor m but also a load factor l of the power conversion device.

Figure 9:
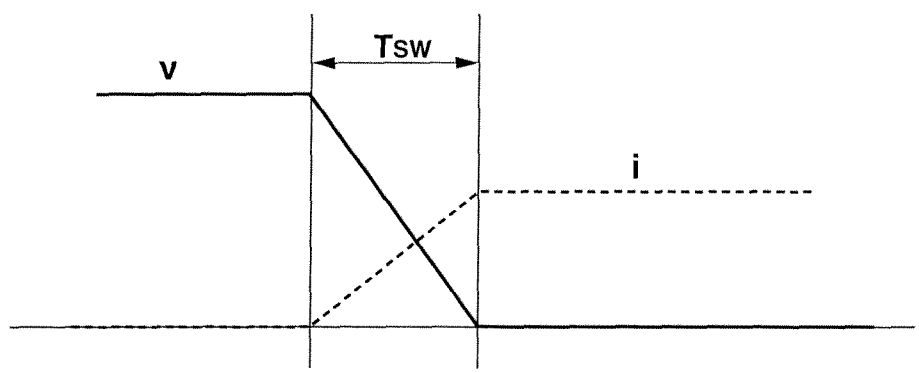
[FIG. 9] An explanatory view of a switching loss.

A main loss of the power conversion device can be classified into a conduction loss and the switching loss. FIG. 9 is an explanatory view of the switching loss. A following formula (5) represents a loss $w_{sw}$ per one switching. A following formula (6) represents a switching loss Wsw per unit time. For simplicity's sake, the following explanations will be given assuming that a voltage v and a current i vary linearly as shown in FIG. 9.

[Formula 5]

$$w_{sw}=\int^{T_{sw}} v \cdot i \, dt [J] \quad (5)$$

[Formula 6]

$$W_{sw}=f_{sw}\int^{T_{sw}} v \cdot i \, dt [W] \quad (6)$$

In such a case, the energy $w_{sw}$ which is lost within a switching time Tsw is represented by the above formula 5. Moreover, the switching loss Wsw per unit time is proportional to a magnitude of the current i as represented by the above formula (6). Hence, in a case that the load factor l is low and the current i flowing in the semiconductor switching element is small, the switching loss Wsw does not become very problematic.

On the other hand, in a case that the load factor l is high and the current i flowing in the semiconductor switching element is large, the switching loss Wsw increases with the rise of the load factor l and the current Accordingly, in a region (interval) for which the load factor l is low, the three-arm modulation method is realized to reduce the noise and harmonic components because the switching loss Wsw does not become problematic. In a region (interval) for which the load factor l is high, the two-arm modulation method is realized to reduce the switching loss Wsw.

Figure 10:
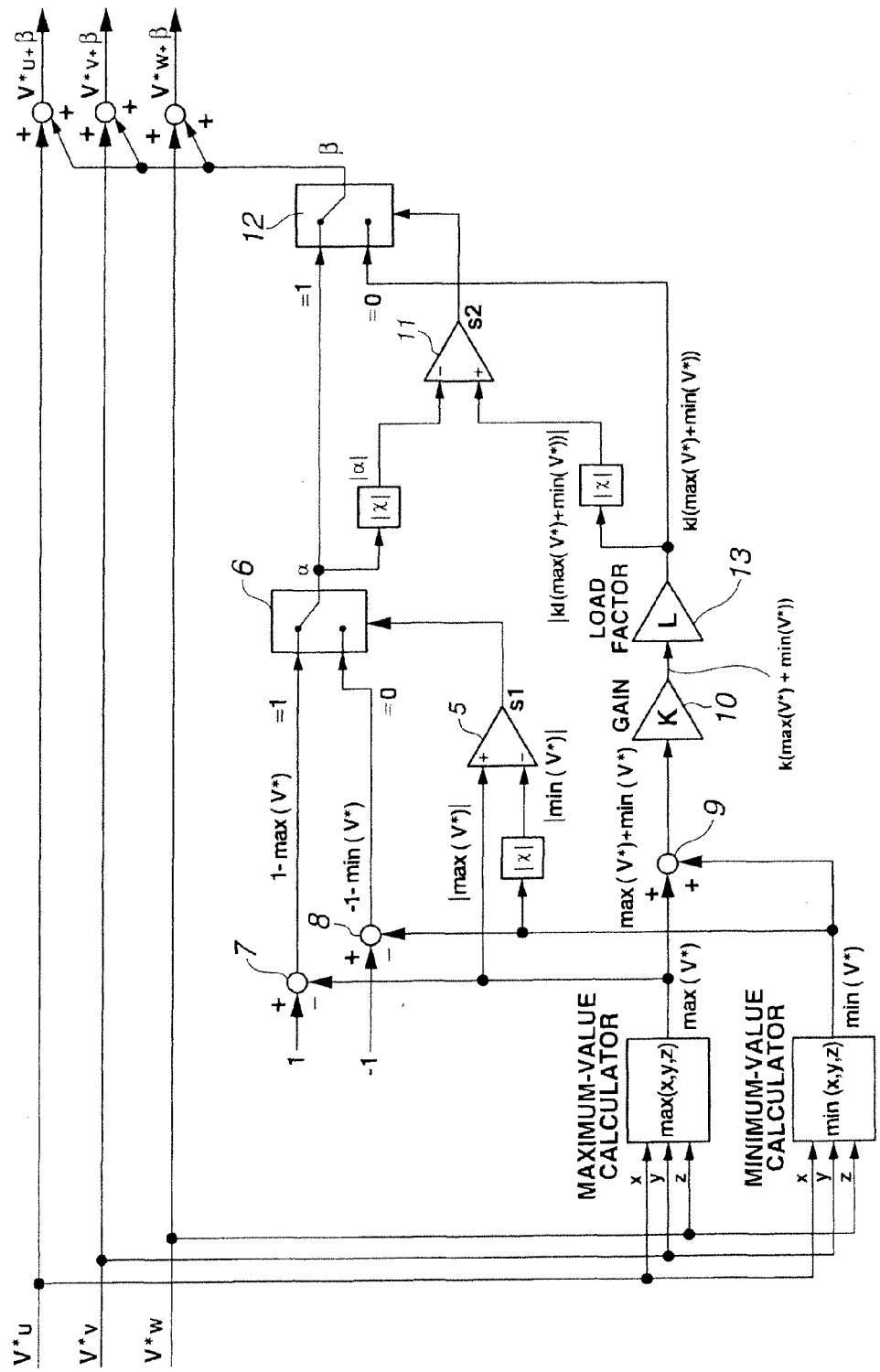
[FIG. 10] A configuration view showing one example of the correction-term adder 1 in a third embodiment.

FIG. 10 is a configuration diagram showing one example of a correction-term adder 1 in the third embodiment. In a control method of the power conversion device in the third embodiment, a correction amount β produced in consideration of the load factor l is added to the voltage command values $V^*_U$, $V^*_V$ and $V^*_W$ so that the corrected voltage command values $V^*_U+β$, $V^*_V+β$ and $V^*_W+β$ are produced.

Specifically, a load-factor multiplier 13 multiplies the load factor l of the power conversion device by the signal k(max(V*)+min(V*)) outputted from the gain multiplier 10. Thereby, a signal kl(max(V*)+min(V*)) is obtained. The signal kl(max(V*)+min(V*)) is provided for being added in order to apply an inclination to a rapid change of voltage which causes a problem in the two-arm modulation method.

Then, an absolute value |kl(max(V*)+min(V*))| of the signal kl(max(V*)+min(V*)) calculated by the load-factor multiplier 13 is inputted to one input terminal of the comparator 11. Moreover, the signal kl(max(V*)+min(V*)) calculated by the load-factor multiplier 13 is inputted to the switch 12.

The correction amount β is produced from the correction amount α and the signal kl(max(V*)+min(V*)) in the switch 12 by selecting smaller one of absolute values of the correction amount α and the signal kl(max(V*)+min(V*)). This switch 12 sets the signal s2 at 1 at the time of satisfaction of |α|<|kl(max(V*)+min(V*))|, and sets the signal s2 at 0 at the time of satisfaction of |α|≥|kl(max(V*)+min(V*))|, by comparing the absolute value of the correction amount α with the absolute value of the signal kl(max(V*)+min(V*)). The produced correction amount β is added to the voltage command value V* so that the corrected voltage command value V*+β is produced. The other configurations are similar as the first embodiment.

Figure 11:
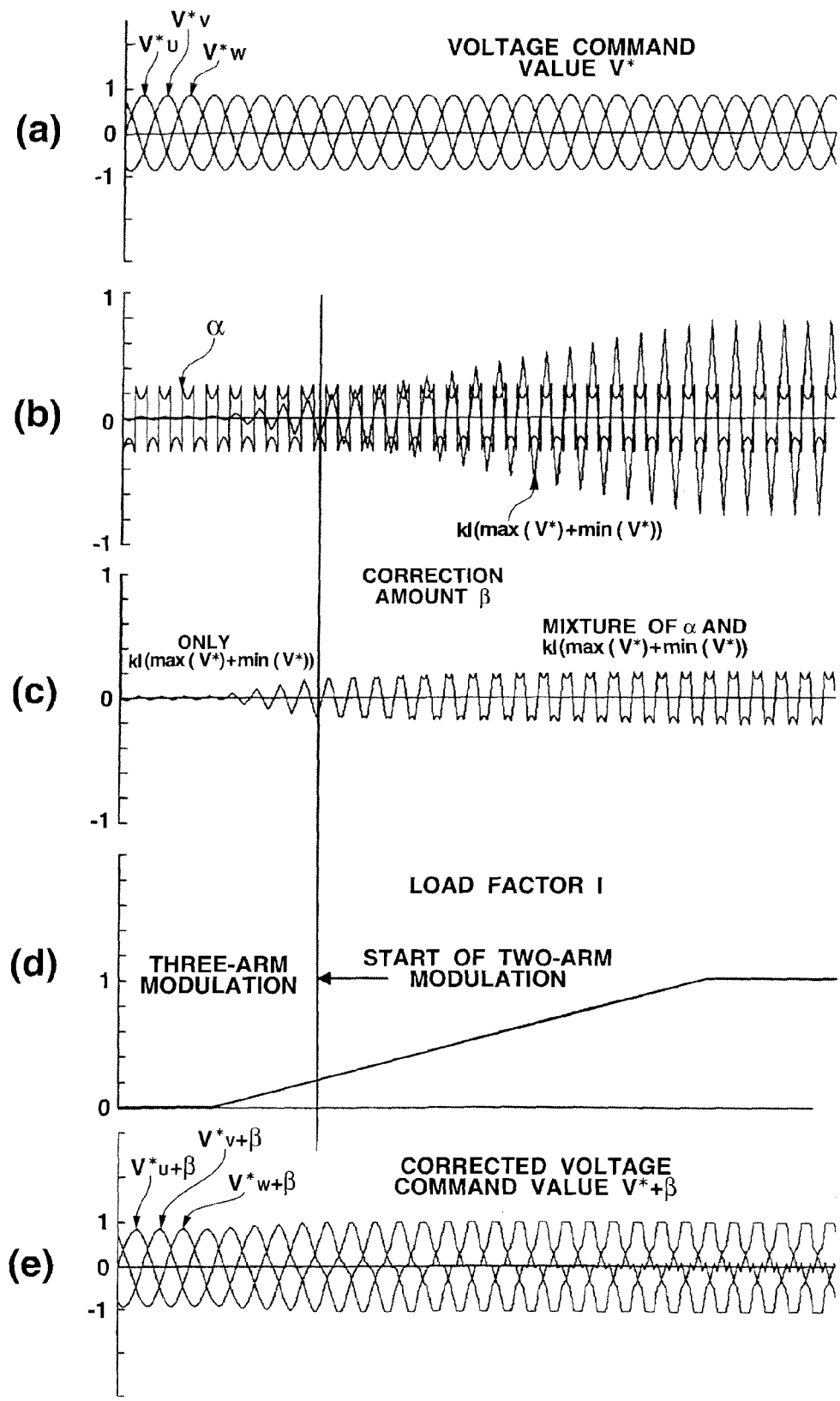
[FIG. 11] A time chart showing one example of respective signal waveforms in a case that a load factor l is enlarged in the third embodiment.

A concrete example of the third embodiment will now be explained. FIG. 11 (a) is a time chart of the voltage command values $V^*_U$, $V^*_V$ and $V^*_W$. FIG. 11 (b) is a time chart of the correction amount α and the signal kl(max(V*)+min(V*)). FIG. 11 (c) is a time chart of the correction amount β. FIG. 11 (d) is a time chart of the load factor l. FIG. 11 (e) is a time chart of the corrected voltage command values $V^*_U$+β, $V^*_V$+β and $V^*_W$+β in the third embodiment. In this example, the gain k is equal to 1.8 (k=1.8), and the modulation factor m is equal to 0.85 (m=0.85).

As shown in FIGS. 11(b) and 11(c), an amplitude of the signal kl(max(V*)+min(V*)) becomes larger as the load factor l becomes higher. The correction amount β shown in FIG. 11 (c) is produced by selecting from the correction amount α and the signal kl(max(V*)+min(V*)) by means of smaller-one selection in absolute value. Thus, in the case that smaller one in absolute value is selected from the correction amount α and the signal kl(max(V*)+min(V*)), only the signal kl(max(V*)+min(V*)) is selected as the correction amount β in a region (interval) where the load factor l is small.

In a region (interval) where the load factor l is large, absolute values of maximum values and minimum values of the signal kl(max(V*)+min(V*)) are greater than the absolute value of the correction amount α. Hence, in the case that smaller one in absolute value is selected as is the correction amount β from the correction amount α and the signal kl(max(V*)+min(V*)), a mixture of the signal kl(max(V*)+min(V*)) and the correction amount α that is used in the two-arm modulation method are selected as the correction amount β.

Since the correction amount β calculated by the method of the third embodiment is added to each of the voltage command values $V^*_U$, $V^*_V$ and $V^*_W$; the three-arm modulation method is realized when the load factor l is small, on the other hand, the two-arm modulation method is realized when the load factor l is large. That is, a changeover between the three-arm modulation method and the two-arm modulation method can be attained according to the load factor l.

As a result, when the load factor l is low, the three-arm modulation is employed because the switching loss Wsw is small. At this time, the noise and the harmonic components can be reduced. When the load factor l is high, the two-arm modulation is employed. At this time, the switching loss Wsw can be reduced.

The third embodiment produces advantageous effects similar as the first and second embodiments.

It is conceivable that the third embodiment is applied to, for example, a power conversion device such as a solar power conditioner system (PCS) in which a variation of the load factor l is gentle.

[Fourth Embodiment]

In the third embodiment, the load factor l is simply multiplied by the signal k(max(V*)+min(V*)). However, the load factor l of an uninterruptible power supply system, an instantaneous-voltage-drop compensating device or the like rapidly rises when a power failure (power outage) or the like occurs. In a case that the control method of the third embodiment is applied to a power conversion device causing such a rapid change of the load factor l, the three-arm modulation method is rapidly changed into the two-arm modulation method at the time of rapid change of the load factor l. As a result, a high stress is given to the device.

Figure 12:
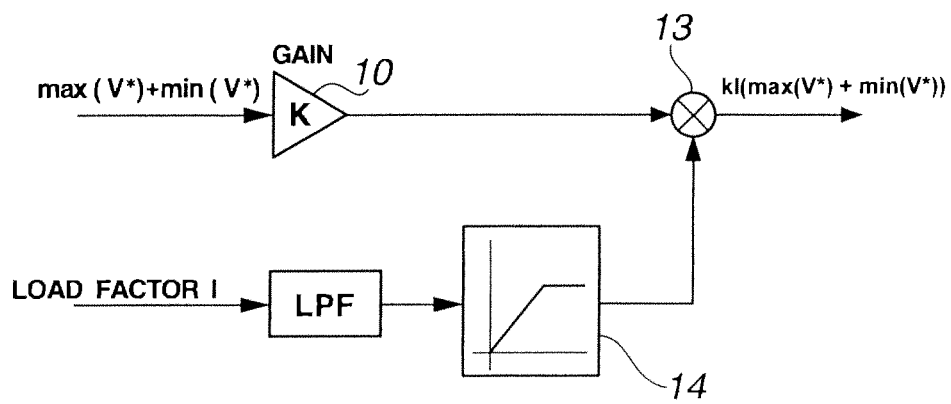
[FIG. 12] A configuration view showing one example of a gain multiplier 10 and a load-factor multiplier 13 according to a fourth embodiment.
Figure 13:
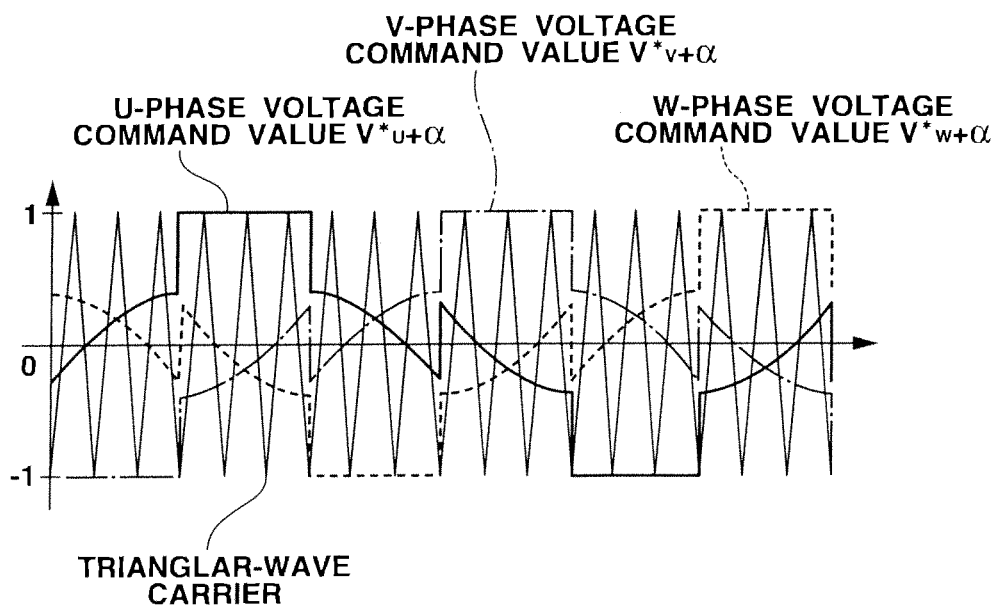
[FIG. 13] A time chart showing one example of voltage command values of three phases and a triangular-wave carrier in a two-arm modulation method.

Therefore, in a fourth embodiment according to the present invention, as shown in FIG. 12, the load factor l is passed through a low-pass filter LPF and a soft-start circuit 14 and then is outputted to the load-factor multiplier 13. The load-factor multiplier 13 multiplies the signal k(max(V*)+min(V*)) by the load factor l passed through the low-pass filter LPF and the soft-start circuit 14. Since the other configurations of the fourth embodiment are similar as the third embodiment, explanations thereof will be omitted from the following disclosures.

The low-pass filter LPF attenuates harmonic components included in the load factor l, and thereby outputs only a fundamental component of the load factor l. Moreover, the soft-start circuit 14 suppresses a time rate of change of the output to a level lower than or equal to a predetermined value, and thereby, gradually increases the output.

As a result, even if the load factor l rapidly changes, the signal which is inputted to the load-factor multiplier 13 can be gently varied as shown in FIG. 11 (d).

Accordingly, the power conversion device can have a gradual transition from the three-arm modulation method into the two-arm modulation method, so that a load of the power conversion device can be assuaged.

Moreover, the fourth embodiment produces advantageous effects similar as the first to third embodiments.

It is conceivable that the fourth embodiment is applied to, for example, an uninterruptible power supply system, an instantaneous-voltage-drop compensating device and the like in which the variation of the load factor I is rapid.

Only the above concrete examples according to the present invention have been explained in detail. However, it is obvious to a skilled person in the art that various modifications and variations of the above examples can be done within technical ideas according to the present invention. As a matter of course, such modifications and variations are included in technical scopes of respective claims.

For example, although the method in which the voltage command values of three phases are corrected has been explained in the first to fourth embodiments, the present invention is applicable to voltage command values of multiple phases more than or equal to three phases.

LIST OF REFERENCE SIGNS

1—Correction-term adder
$V^*_U$, $V^*_V$, $V^*_W$—Voltage command value
$G_U$, $G_V$, $G_W$, $G_X$, $G_Y$, $G_Z$—Gate signal
α, β—Correction amount
k—Gain max (V*)—Maximum value of voltage command value
min (V*)—Minimum value of voltage command value

What is claimed is:

1. A method of controlling a power conversion device for converting alternating current into direct current or direct current into alternating current, wherein the power conversion device is configured to output a gate signal to a semiconductor switching element provided in the power conversion device, wherein the gate signal is obtained by a gate-signal generating section configured to apply a pulse-width modulation to a voltage command value, the method comprising steps of:

comparing a maximum value among the voltage command values of multiple phases with an absolute value of a minimum value among the voltage command values of the multiple phases in a correction-term adder provided in the gate-signal generating section;

calculating a first correction amount in the correction-term adder by selecting a signal obtained by subtracting the maximum value among the voltage command values from a maximum value of a triangular-wave carrier if the maximum value among the voltage command values is larger than the absolute value of the minimum value, and selecting a signal obtained by subtracting the minimum value among the voltage command values from a minimum value of the triangular-wave carrier if the absolute value of the minimum value is larger than the maximum value among the voltage command values;

producing a triangular-wave-shaped signal in the correction-term adder by multiplying a gain by an addition signal of the maximum value among the voltage command values and the minimum value, wherein the triangular-wave-shaped signal is synchronized with the first correction amount;

producing a second correction amount in the correction-term adder by selecting smaller one in absolute value between the triangular-wave-shaped signal and the first correction amount;

calculating corrected voltage command values in the correction-term adder by adding the second correction amount respectively to the voltage command values of the multiple phases;

obtaining the gate signal by the pulse-width modulation of each of the corrected voltage command values; and outputting the gate signal to the semiconductor switching element.

2. The method of controlling a power conversion device as claimed in claim 1, wherein
the gain varies according to a modulation factor of the voltage command values.

3. The method of controlling a power conversion device as claimed in claim 1, wherein
the triangular-wave-shaped signal synchronized with the first correction amount is produced by multiplying a load factor by the multiplication of the gain and the addition signal of the maximum value among the voltage command values and the minimum value.

4. The method of controlling a power conversion device as claimed in claim 3, wherein
an attenuation of harmonic components and a suppression of time rate of change have been applied to the load factor by a low-pass filter and a soft-start circuit.

* * * * *